US010821956B2

(12) United States Patent
Obal (10) Patent No.: US 10,821,956 B2
(45) Date of Patent: Nov. 3, 2020

(54) AIR BRAKE ADJUSTMENT TOOL AND VEHICLE GENERAL MULTI-TOOL

(71) Applicant: Michael Obal, Courtenay (CA)

(72) Inventor: Michael Obal, Courtenay (CA)

( * ) Notice: Subject to any disclaimer, the term of this patent is extended or adjusted under 35 U.S.C. 154(b) by 187 days.

(21) Appl. No.: 16/314,131

(22) PCT Filed: Jul. 10, 2017

(86) PCT No.: PCT/CA2017/050834
§ 371 (c)(1),
(2) Date: Dec. 28, 2018

(87) PCT Pub. No.: WO2018/010020
PCT Pub. Date: Jan. 18, 2018

(65) Prior Publication Data
US 2019/0217843 A1    Jul. 18, 2019

Related U.S. Application Data

(60) Provisional application No. 62/360,689, filed on Jul. 11, 2016.

(51) Int. Cl.
*B60T 17/22* (2006.01)
*B60T 13/26* (2006.01)
(Continued)

(52) U.S. Cl.
CPC ............ *B60T 17/221* (2013.01); *B60T 13/26* (2013.01); *B60T 17/18* (2013.01); *B60T 17/22* (2013.01); *B25B 27/14* (2013.01)

(58) Field of Classification Search
CPC .............................. B60T 17/22; B60T 17/221
(Continued)

(56) References Cited

U.S. PATENT DOCUMENTS 4,486,937 A * 12/1984 Teramo ................... B25B 7/123
29/268
4,550,460 A * 11/1985 Smallbrook ........ B25B 27/0035
7/164

(Continued)

OTHER PUBLICATIONS

Canadian Intellectual Property Office, "International Search Report", dated Oct. 24, 2017, 2 pages, Quebec, Canada.

(Continued)

*Primary Examiner* — Eric S. McCall
(74) *Attorney, Agent, or Firm* — Tomlinson McKinstry, P.C.

(57) ABSTRACT

An air-brake adjustment multi-tool having a longitudinally extending handle assembly and a bifurcated pry end releasably fixable to one end of the handle assembly in selected angular positions (e.g., 90 degrees, 135 degrees, 180 degrees (i.e, linear), 225 degrees and 270 degrees). The pry end includes two spaced-apart tines, each having a thin lip, a curved transition and a wedge face. The handle assembly is reversibly extendible (telescoping). At the end of the handle assembly opposite the pry end, there are: a removeable hand grip/load-strap-ratchet-engager; and a tool mount for releasably attaching a ratcheting socket wrench head and other implements (e.g., fifth-wheel puller attachment/adapter/ hook, screw drivers etc.) The multi-tool includes a light releasable attachable to the handle assembly.

18 Claims, 4 Drawing Sheets

(51) Int. Cl.
*B60T 17/18* (2006.01)
*B25B 27/14* (2006.01)

(58) Field of Classification Search
USPC .......................................... 73/121, 128, 129
See application file for complete search history.

(56) References Cited

U.S. PATENT DOCUMENTS

| | | | | |
|---|---|---|---|---|
| 4,685,164 | A * | 8/1987 | Sebalos | B25B 27/0035 7/100 |
| 4,713,991 | A * | 12/1987 | Gaug | B25B 13/48 81/176.1 |
| 4,864,900 | A * | 9/1989 | Kreikle | B25B 27/0035 81/119 |
| 5,003,680 | A * | 4/1991 | Vesely | B25B 27/306 29/227 |
| D457,795 | S * | 5/2002 | Mohammed | D8/51 |
| 7,322,084 | B2 | 1/2008 | Horsman | |
| 8,297,594 | B1 | 10/2012 | Ontiveros | |
| 8,826,504 | B1 * | 9/2014 | Slivon | B25B 27/0035 29/239 |
| 9,283,664 | B2 | 3/2016 | Clemetson et al. | |
| 2006/0005366 | A1 * | 1/2006 | Ploeger | F16D 65/0043 29/225 |
| 2008/0295917 | A1 * | 12/2008 | Robinson | F15B 21/044 141/351 |
| 2010/0236044 | A1 * | 9/2010 | Bearman | B25B 27/0021 29/428 |
| 2013/0298543 | A1 * | 11/2013 | Hsieh | F15B 21/00 60/407 |
| 2015/0251298 | A1 * | 9/2015 | Robson | B25B 13/48 303/121 |
| 2016/0084627 | A1 * | 3/2016 | Reble | G01B 3/30 33/609 |
| 2018/0003476 | A1 * | 1/2018 | White | G01B 5/06 |
| 2018/0335097 | A1 * | 11/2018 | Dahl | B25B 27/0035 |
| 2019/0076997 | A1 * | 3/2019 | Hernandez, Jr. | F16D 65/0043 |
| 2019/0120303 | A1 * | 4/2019 | Goodman | B25B 27/0035 |
| 2019/0186569 | A1 * | 6/2019 | Abernathy | F16D 71/00 |
| 2020/0047320 | A1 * | 2/2020 | Luangphon | B25B 27/306 |
| 2020/0080604 | A1 * | 3/2020 | Schwenke | B25B 27/04 |

OTHER PUBLICATIONS

Canadian Intellectual Property Office, "Written Opinion of the International Searching Authority", dated Oct. 18, 2017, 3 pages, Quebec, Canada.

* cited by examiner

AIR BRAKE ADJUSTMENT TOOL AND VEHICLE GENERAL MULTI-TOOL

CROSS REFERENCE TO RELATED APPLICATIONS

This application claims the benefit of U.S. Patent Application No. 62/360,689, filed 11 Jul. 2016.

FIELD OF THE INVENTION

The present invention relates to the field of tools suitable for use with vehicles, particularly tools for use in maintaining desired air-brake adjustment and for other common tasks on vehicles having air brakes.

BACKGROUND OF THE INVENTION

Vehicle air brake systems utilize compressed air to actuate the wheel braking component. In general terms, the five main components of an air brake system are: the compressor, which pressurizes the air; a reservoir, which store the pressurized air; the brake chambers, which, translate air pressure into linear movement (via a diaphragm and push rod); the brake assembly, which includes the brake shoes and drums for creating the friction needed to stop the vehicle and linkages that translate the linear movement of the push rod into rotational movement of the brake cam shaft; and, interposed inline between the reservoir and the brake chambers, the foot valve (brake pedal), by which the operator applies the brakes by permitting the pressurized air to flow to the brake chambers.

Brake chambers (also referred to as service brake chambers) typically include a pot, being a metal chamber; a diaphragm spanning the pot and connected to a pushrod that protrudes from the pot; a return spring (typically a large coil spring) positioned so as to resiliently bias the pushrod to a brake disengaged position; and an inlet for receiving pressurized air from the foot valve.

Typical brake assemblies include: a brake drum connected to, and rotating with, the axle; brake shoes disposed within the brake drum and having a brake pad material; a brake cam that when rotated causes the brake shoes to move towards the inner wall of the brake drum so as to create a frictional braking force between the brake pad material and the inner wall of the brake drum; a brake cam shaft connected at one end to the brake cam; a slack adjuster connected to the other end of the brake cam shaft and connected to the pushrod (typically by a yoke pin passing through a hole in the slack adjuster crank arm (being a projection typically integral to the slack adjuster body) and a yoke affixed to the end of the pushrod (typically threaded to the end of the pushrod and fixed by a yoke nut tightened against the yoke)). The slack adjuster acts as a crank in that essentially linear movement applied to the slack adjuster by the pushrod causes rotational (essentially pivotal) movement of the brake cam shaft (and thus, application and release of the brakes).

In use, the frictional interaction of the brake shoes and the brake drum causes wear, primarily to the brake pad material. As a result, with use, the thickness of the brake pad material diminishes and the distance the brake shoes must move to provide adequate braking friction increases.

The slack adjuster is configured to provide a means for adjusting the brakes, by controlled rotation of the slack adjuster body relative to the brake cam shaft. The slack adjuster typically includes a worm gear affixed to the brake cam shaft (typically the worm gear is splined to the brake cam shaft); a worm mounted to the slack adjuster body and rotatable relative to the slack adjuster body; and means for manually rotating the worm, typically a projecting square-head or hex-head extension of the worm. Rotation of the worm causes the slack adjuster body to rotate about the brake cam shaft.

Discovering whether the air brake assembly requires adjustment typically involves determining whether the throw of the pushrod (i.e., the range of movement between a full release position under the resilient biasing of the release spring, and a braking position, being the position at which the brake shoes contact the inner walls of the brake drums) is within specified tolerances for the particular brake chamber. Conventionally, this determination is made by inserting a prying device (e.g., a large standard screw driver) between the pushrod yoke and the slack adjuster crank arm (or other slack adjuster component) to lever the slack adjuster towards the braking position. As air brake assemblies come in a variety of configurations and are in different orientations in different vehicles, such levering may be difficult or impossible in some situations and, at the least, is generally awkward and involves a risk that the prying device will unexpectedly dislodge. Alternatively, the throw of the pushrod may be measured by having the brakes applied, but this approach typically undesirably requires two people, one to control the brakes and one to make the measurements and adjustments.

Many jurisdictions require that air brakes on commercial and passenger carrying vehicles be frequently checked and adjusted. The applicant understands that the known purpose-built tools for brake adjustment are intended for manual brakes, which North American transport trucks have not been equipped with since 1996.

SUMMARY OF THE INVENTION

In one aspect, the present invention provides a multi-tool for use in testing and adjusting a brake system of an air brake equipped vehicle (typically a truck). The multi-tool is intended to permit access to check pushrod travel when space is limited. The multi-tool can be adjusted to reach difficult angles and accommodate different varieties of brake part manufacturers. The multi-tool can be extended to reach difficult areas. A light attachment enhances night time or limited light uses.

The multi-tool provides for releasable attachment of an adjustment tool, i.e., a socket wrench, for adjustment of a slack adjuster, whereby the multi-tool may be used for both testing and adjusting.

In another aspect, the present invention provides a multi-tool for use in testing and adjusting a brake system having a brake chamber, a push rod projecting from the brake chamber and having a distal yoke connected to the crank arm portion of a slack adjuster, the multi-tool including: a handle assembly having a first handle end and a second handle end; a fork assembly comprising two spaced apart tines, being a left tine and a right tine, each tine comprising a tine top comprising: a distal insertion lip surface; an angled wedge face; and a lip-wedge transition curve surface between the insertion lip surface and wedge face; and wherein the fork assembly is releasably fixable to the first handle end in a plurality of selected angular orientations; whereby for testing the brake system by moving the push rod, a user may fix the fork assembly and first handle in a desired angular position and may insert: one of the tines into the yoke adjacent the slack adjuster crank arm; or the tines between the yoke and brake chamber, with the tines on opposite sides of the push rod.

Each tine may include a planar tine bottom surface; and in each tine: the insertion lip surface may be planar and substantially parallel to the tine bottom surface; and the wedge face may be planar and may be at an angle to the tine bottom of about 15 degrees to about 25 degrees.

In each tine: a tip thickness, being a distance between the insertion lip surface and the tine bottom surface, may be about 2 mm to about 5 mm; and an insertion lip length, being the extent of the insertion lip surface along a length of the tine, may be about 4 mm to about 9 mm.

In each tine: the wedge face may be at an angle to the tine bottom of about 19 degrees; the tip thickness may be about 3.2 mm; the insertion lip length may be about 6.4 mm; and the lip-wedge transition curve surface may be an inner curve substantially conforming to a section of an inner wall of a right angle cylinder having a lip-wedge transition curve radius of about 40 mm to about 80 mm. The the lip-wedge transition curve radius may be about 57 mm.

The left tine and the right tine may be substantially parallel one to the other, and may define a slot therebetween having a slot width of about 15 mm to about 25 mm. The slot width may be about 19 mm.

The selected angular orientations may include five discrete angular orientations, including a linear orientation.

The multi-tool may include a handle grip releasably securable to the second handle end. The multi-tool may be for use with a load strap ratchet having a pry hole and the handle grip may be sized for engagement with the pry hole.

The multi-tool may include a tool mount at the second handle end for releasably attaching an implement to the second handle end. The implement may be a socket wrench head.

The handle assembly may include: a handle sleeve having a handle sleeve interior; and a handle shaft in slidable telescoping engagement with the handle sleeve interior, whereby the handle assembly may be reversibly lengthened by sliding the handle shaft within the handle sleeve. The multi-tool may include telescope lock means for releasably fixing the handle shaft relative to the handle sleeve in a plurality of discrete telescope positions.

The multi-tool may include: a handle grip for attaching to the second handle end; and a handle-grip lock-release for releasably securing the handle grip when the handle grip is attached to the second handle end; wherein, moving the handle shaft to a fully compressed telescoping position relative to the handle sleeve actuates the handle-grip lock-release to change from a default handle-grip lock position to a handle-grip release position permitting detachment of the handle grip from the second handle end.

The multi-tool may include: one or more implements; a tool mount at the second handle end for releasably attaching one of the one or more implements to the second handle end; and a tool-mount lock-release for releasably securing the implement when the implement is attached to the tool mount; wherein, moving the handle shaft to a fully compressed telescoping position relative to the handle sleeve actuates the tool-mount lock-release to change from a default tool-mount lock position to a tool-mount release position permitting detachment of the implement from the tool mount.

The multi-tool may include: a handle grip for attaching to the second handle end; a handle-grip lock-release for releasably securing the handle grip when the handle grip is attached to the second handle end; one or more implements; a tool mount at the second handle end for releasably attaching one of the one or more implements to the second handle end; and a tool-mount lock-release for releasably securing the implement when the one of the one or more implements is attached to the tool mount; wherein, use of one or the other of the handle grip and the tool mount precludes use of the other, in that: when the handle grip is attached to the second handle end, the one of the one or more implements may not be attached to the second handle end; and when the one of the one or more implements is attached to the tool mount, the handle grip may not be attached to the second handle end; wherein, moving the handle shaft to a fully compressed telescoping position relative to the handle sleeve: actuates the handle-grip lock-release to change from a default handle-grip lock position to a handle-grip release position permitting detachment of the handle grip from the second handle end; and actuates the tool-mount lock-release to change from a default tool-mount lock position to a tool-mount release position permitting detachment of the implement from the tool mount.

The multi-tool may include a light releasably attachable to the handle assembly.

DETAILED DESCRIPTION WITH REFERENCE TO THE DRAWINGS

At times herein, terms are used that could be read as suggesting a fixed or absolute orientation (e.g., left, right, top, bottom, side etc.). To be clear, these terms are used merely for ease of understanding (they generally follow the orientations shown in the drawings) and should not be read as limiting the relevant subject matter to a particular orientation. The subject matter of the present application is a hand tool that could be positioned in any orientation desired by the user.

As shown in the drawings, embodiments of the present invention include an air-brake adjustment multi-tool 100 comprising a handle assembly 110, a fork assembly 112, a ratcheting socket ratchet wrench head 114 and a light 116.

The handle assembly 110 includes a handle shaft 120, a handle sleeve 122 in telescoping engagement with the handle shaft 120, a slidable release collar 124, a piston 126, a handle grip 128 and two light mounts 130 (each light mount 130 including a rare-earth-magnet).

Figure 1:
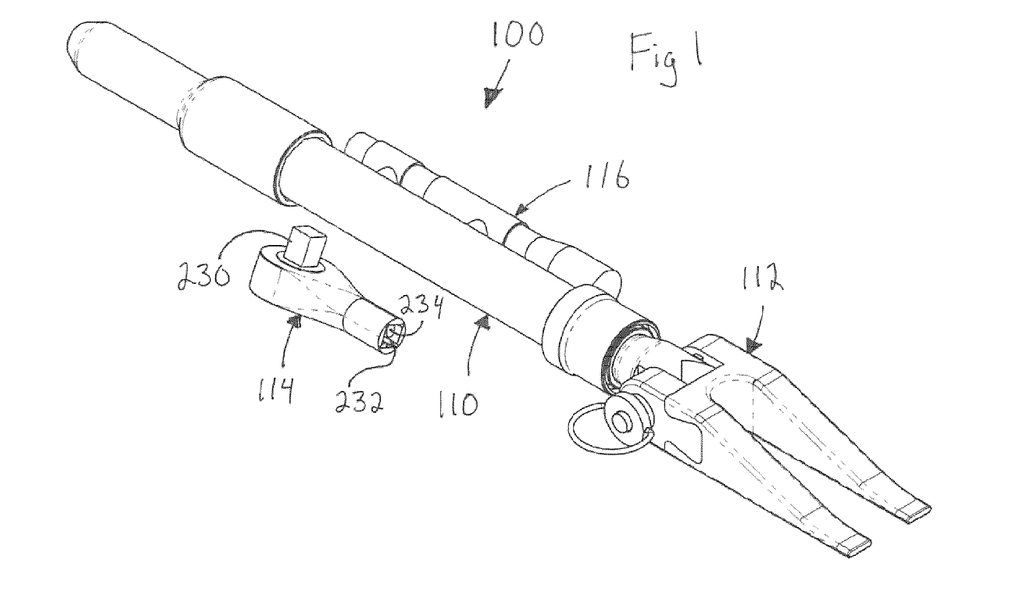
FIG. 1 is an isometric view of an air-brake adjustment multi-tool embodiment of the present invention shown in the fully compressed position.
Figure 2:
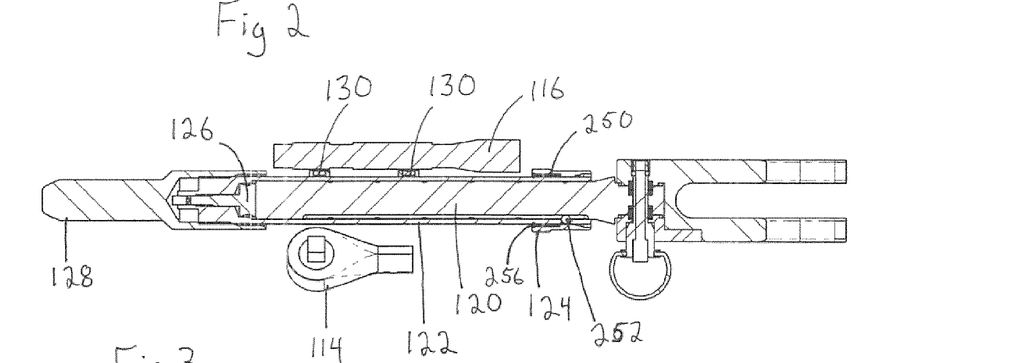
FIG. 2 is a top plan sectional view of the embodiment of FIG. 1 shown in the fully compressed position.
Figure 3:
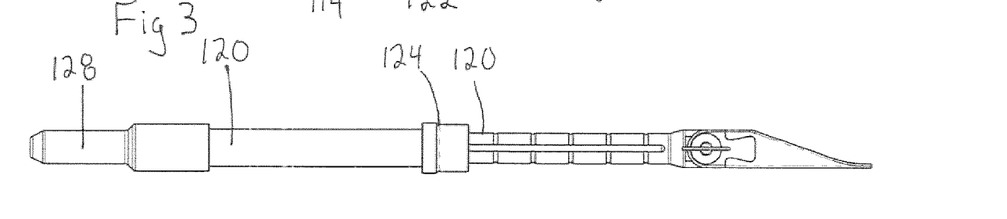
FIG. 3 is a side elevation view of the embodiment of FIG. 1 shown in the full extended position.
Figure 4:
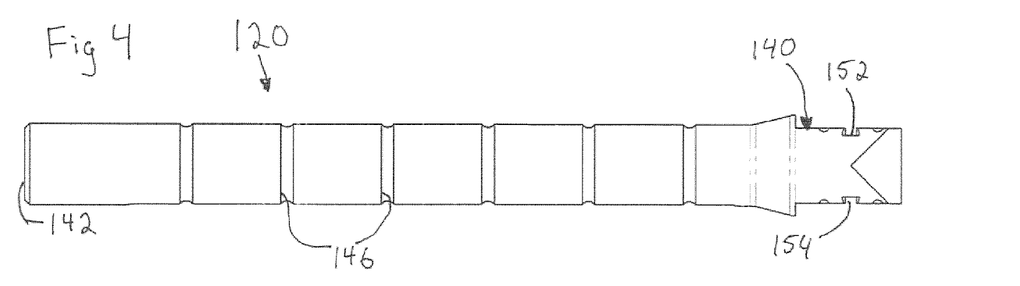
FIG. 4 is a top plan view of the handle shaft of the embodiment shown in FIG. 1.
Figure 5:
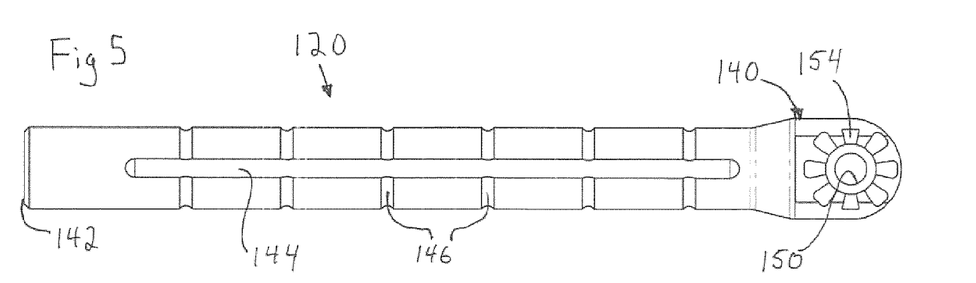
FIG. 5 is side elevation view of the handle shaft shown in FIG. 4.
Figure 6:
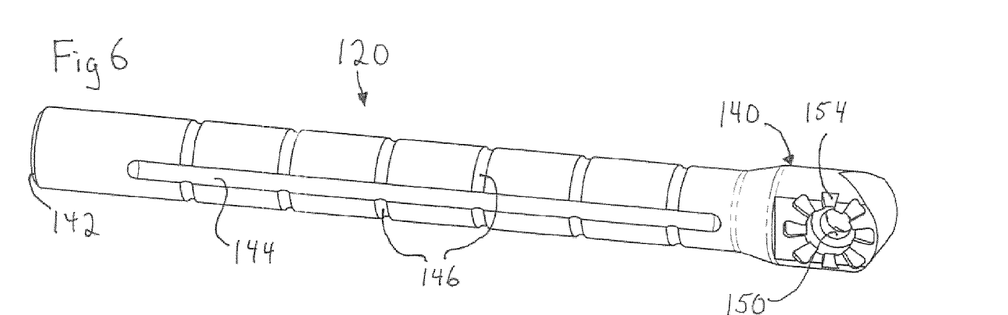
FIG. 6 is an isometric view of the handle shaft shown in FIG. 4.

The handle shaft 120 has a fork end 140, a piston end 142, a longitudinally extending alignment groove 144, and six spaced-apart circumferential telescope position grooves 146.

The fork end 140 has a fork-end lock bore 150 therethrough, a first spline cavity array 152 and a second spline cavity array 154. Each of the first spline cavity array 152 and the second spline cavity array 154 is arranged in a radial array about, and concentric with, a respective end of the fork-end lock bore 150.

Figure 7:
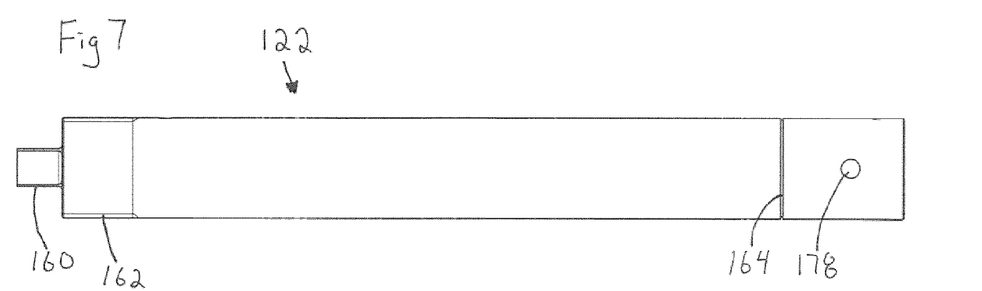
FIG. 7 is a side elevation view of the handle sleeve of the embodiment shown in FIG. 1.
Figure 8:
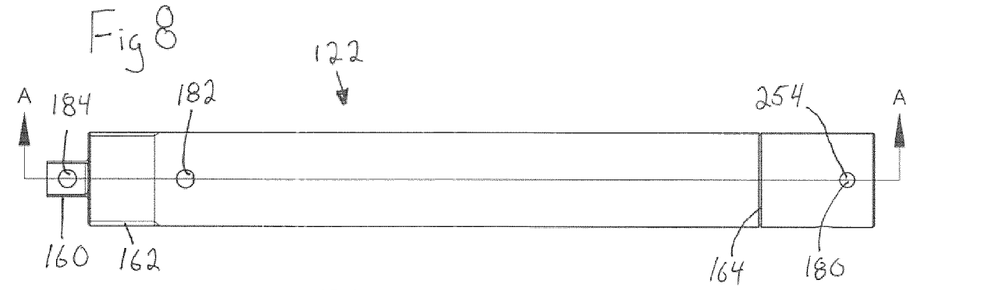
FIG. 8 is a top plan view of the handle sleeve shown in FIG. 7, indicating section view A-A.
Figure 9:
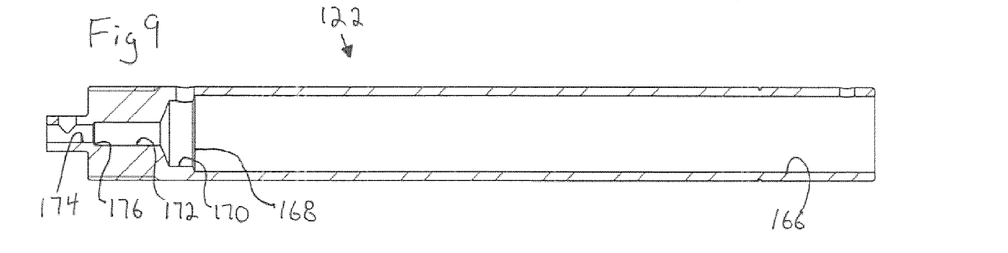
FIG. 9 is a side elevation section view of the handle sleeve shown in FIG. 7, being the section view A-A indicated in FIG. 8.

The handle sleeve 122 includes a socket-wrench-head square mount 160, a handle-grip male thread 162, a collar-spring-retainer-ring groove 164, a handle-shaft receiving bore 166, a piston-retaining-ring groove 168, a piston-head receiving bore 170, a piston-shaft receiving bore 172, a piston-stem receiving bore 174, a piston-spring seat 176 defined by and located between the piston-shaft receiving bore 172 and the piston-stem receiving bore 174, an alignment-ball hole 178 extending between the exterior of the handle sleeve 122 and the handle-shaft receiving bore 166, a telescope-position-ball hole 180 extending between the exterior of the handle sleeve 122 and the handle-shaft receiving bore 166, a handle-grip retention ball hole 182 extending between the exterior of the handle sleeve 122 and the piston-head receiving bore 170, and a socket-wrench-head retention ball hole 184 extending between the exterior of the socket-wrench-head square mount 160 and the piston-stem receiving bore 174.

Figure 11:
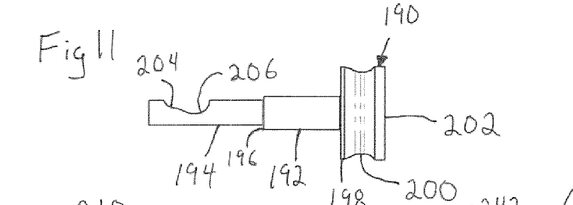
FIG. 11 is a side elevation view of the retainer piston of the embodiment shown in FIG. 1.

The piston 126 includes a piston head 190, a piston shaft 192, a piston stem 194, a piston-spring shoulder 196 defined by and located between the piston shaft 192 and the piston stem 194. The piston head 190 includes a circumferential handle-grip retention rim 198, a circumferential handle-grip release channel 200 and a piston face 202. The piston stem 194 includes a socket-wrench-head retention indent 204 and a socket-wrench-head release indent 206.

Figure 12:
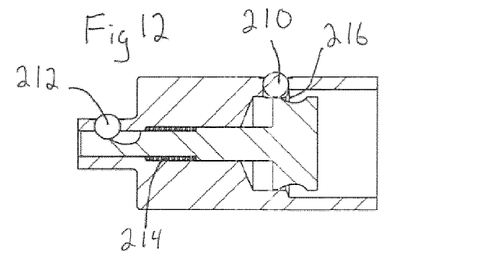
FIG. 12 is a section isolation side elevation view of the grip end of the handle sleeve shown with the retainer piston in the piston retention position.

As shown in FIG. 12, in use, the piston 126 is located within the handle sleeve 122 in association with: a handle-grip retention ball 210 disposed within the handle-grip retention ball hole 182, a socket-wrench-head retention ball 212 disposed within the socket-wrench-head retention ball hole 184, a piston spring 214 being a coil compression spring disposed about the piston shaft 192 and interposed between the piston-spring seat 176 and the piston-spring shoulder 196, and a piston retaining ring 216 having an outer circumferential periphery seated in the piston-retaining-ring groove 168 and an inner circumferential portion intruding into the circumferential cavity defined by the handle-grip release channel 200.

The end of the handle-grip retention ball hole 182 at the exterior of the handle sleeve 122 is shaped (e.g., by deformation of the adjacent material) to permit the handle-grip retention ball 210 to project from the handle-grip retention ball hole 182 while retaining the handle-grip retention ball 210 in the handle-grip retention ball hole 182. The end of the socket-wrench-head retention ball hole 184 is shaped (e.g., by deformation of the adjacent material) to permit the socket-wrench-head retention ball 212 to project from the socket-wrench-head retention ball hole 184 while retaining the socket-wrench-head retention ball 212 in the socket-wrench-head retention ball hole 184.

The piston spring 214 resiliently biases the piston head 190 against the piston retaining ring 216 (within the handle-grip release channel 200) in a piston retention position in which the handle-grip retention rim 198 is abutting the handle-grip retention ball 210 and the socket-wrench-head retention indent 204 is abutting the socket-wrench-head retention ball 212.

The handle grip 128 and ratcheting socket wrench head 114 may be interchangeably attached to the handle sleeve 122.

Figure 10:
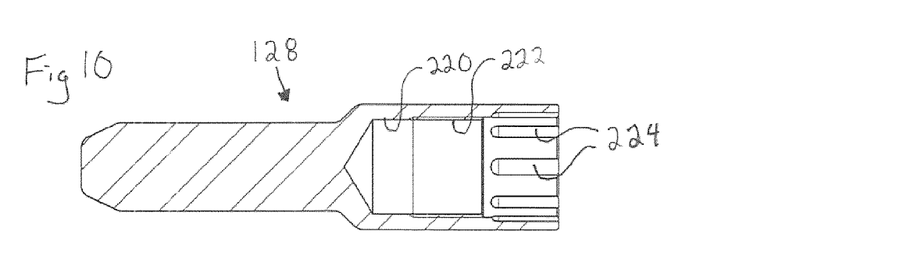
FIG. 10 is a section view of the handle grip of the embodiment shown in FIG. 1.

The handle grip 128 includes a handle grip chamber 220 having a handle-grip female thread 222 for threadedly engaging the handle-grip male thread 162 and an array of longitudinally extending handle-grip retention grooves 224 for receiving a projecting portion of the handle-grip retention ball 210 (when in the piston retention position) so as to impede relative rotational movement between the handle grip 128 and the handle sleeve 122 (e.g., so as to impede unthreading of the handle-grip female thread 222 from the handle-grip male thread 162).

The ratcheting socket wrench head 114 includes a square drive 230 for engaging conventional sockets (not shown), a square-mount receiver 232 for receiving the socket-wrench-head square mount 160 and, within the square-mount receiver 232, at least one socket-wrench-head retention hollow 234 for receiving a projecting portion of the socket-wrench-head retention ball 212 (when in the piston retention position) so as to impede extraction of the socket-wrench-head square mount 160 from the square-mount receiver 232.

The piston 126 may be moved from the piston retention position to a piston release position (in which the socket-wrench-head release indent 206 is aligned with the socket-wrench-head retention ball hole 184 thus reducing the projection of the socket-wrench-head retention ball 212 from the socket-wrench-head retention ball hole 184, and the handle-grip release channel 200 is aligned with the handle-grip retention ball hole 182 thus reducing the projection of the handle-grip retention ball 210 from the handle-grip retention ball hole 182) by hand manipulating the handle shaft 120 relative to the handle sleeve 122 so as to cause the piston end 142 to press against the piston face 202 sufficiently to compress the piston spring 214. Once such hand manipulation ceases, the piston spring 214 tends to cause the piston 126 to return to the piston retention position.

Figure 13:
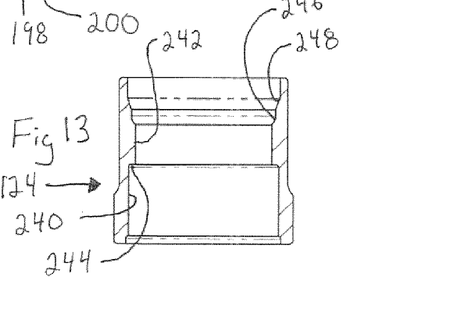
FIG. 13 is a section view of the retainer collar of the embodiment shown in FIG. 1.

The release collar 124 includes a collar-spring bore 240, an alignment-ball bore 242, a collar-spring shoulder 244 defined by and located between the collar-spring bore 240 and the alignment-ball bore 242, a circumferential telescope-position-ball retention recess 246 and a circumferential telescope-position-ball release recess 248. The release collar 124 is associated with a collar spring 250 being a coil compression spring, an alignment ball 252, a telescope-position ball 254 and a collar-spring retaining ring 256. In use: the inner periphery of the collar-spring retaining ring 256 is seated in the collar-spring-retaining-ring groove 164; the collar spring 250 is disposed about the handle sleeve 122 and interposed between the collar-spring retaining ring 256 and the collar-spring shoulder 244 so as to resiliently bias the release collar 124 in a collar retention position; the alignment ball 252 is disposed in the alignment-ball hole 178 between the alignment-ball bore 242 and the alignment groove 144 wherein the alignment-ball bore 242 abuts the alignment ball 252 so as to cause the alignment ball 252 to project into the alignment groove 144; and the telescope-position ball 254 is disposed in the telescope-position-ball hole 180. When the release collar 124 is in the collar retention position, the telescope-position-ball retention recess 246 is aligned with the telescope-position-ball hole 180 such that abutment between the telescope-position-ball retention recess 246 and the telescope-position ball 254 causes the telescope-position ball 254 to project into a one of the telescope position grooves 146 so as to impede relative longitudinal movement (i.e., telescoping movement) between the handle shaft 120 and the handle sleeve 122. A user may hand manipulate the release collar 124 into a collar release position in which the telescope-position-ball release recess 248 is aligned with the telescope-position-ball hole 180 such that abutment between the telescope-position-ball release recess 248 and the telescope-position ball 254 permits relative longitudinal movement (i.e., telescoping movement) between the handle shaft 120 and the handle sleeve 122. This relative longitudinal movement permits the user to lengthen or shorten the handle assembly 110 as desired, between the positions defined by telescope position grooves 146, and to cause the piston end 142 to press against the piston face 202 (see above) so as to change from the piston retention position to the piston release position.

Figures 14, 15, 16:
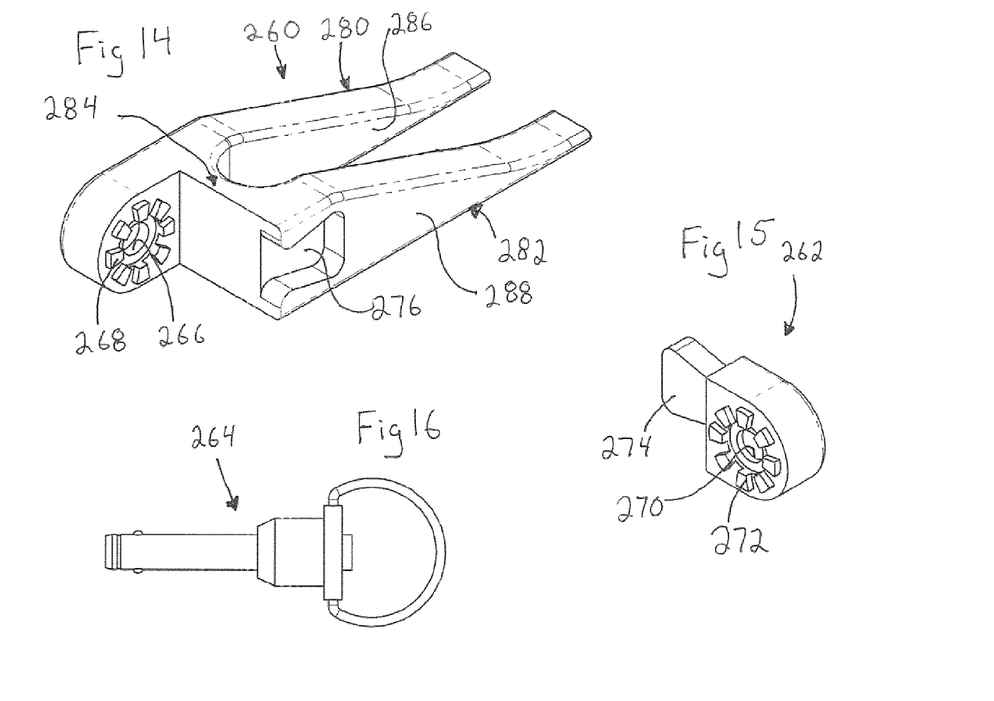
FIG. 14 is an isometric view of the fork of the embodiment shown in FIG. 1.
FIG. 15 is an isometric view of the spline latch of the embodiment shown in FIG. 1, with the spline latch of FIG. 15 shown rotated 90 degrees from the spline latch's mating orientation with respect to the fork shown in FIG. 14.
FIG. 16 is an elevation view of the spline lock of the embodiment shown in FIG. 1.

The fork assembly 112 includes a main fork 260, a fork key 262 and a quick-release pin 264. The main fork 260 has: a fork-pin retention bore 266 for receiving and releasably securing the distal end of the quick-release pin 264; and a main-fork spline latch array 268 arranged in a radial array about, and concentric with, the fork-pin retention bore 266 for engaging with a respective one of the first spline cavity array 152 and the second spline cavity array 154. The fork key 262 has: a key-fork-pin bore 270 for receiving the quick-release pin 264; and a key-fork spline latch array 272 arranged in a radial array about, and concentric with, the key-fork-pin bore 270 for engaging with the other of the first spline cavity array 152 and the second spline cavity array 154. The fork key 262 has a projecting key lobe 274 and the main fork 260 has a key-lobe receiver 276 for mateable engagement with the key lobe 274. When the key lobe 274 and the key-lobe receiver 276 are in mateable engagement, the engagement permits relative movement of the main fork 260 and fork key 262 parallel to the center axis of the fork-pin retention bore 266 and key-fork-pin bore 270 but impedes relative movement of the main fork 260 and fork key 262 lateral to the center axis of the fork-pin retention bore 266 and key-fork-pin bore 270, such that the engagement maintains alignment of the fork-pin retention bore 266 and key-fork-pin bore 270.

In use, the main fork 260 and fork key 262 are secured to the fork end 140 of the handle shaft 120 and releasably fixed in a selected angular position (e.g., 90 degrees, 135 degrees, 180 degrees (i.e, linear), 225 degrees and 270 degrees) relative to the handle shaft 120 by the engagement of the key-fork-pin bore 270 and the key-fork spline latch array 272 with the first spline cavity array 152 and the second spline cavity array 154, with the quick release pin 264 (i.e., extending through the key-fork-pin bore 270 and the fork-end lock bore 150, and releasably secured in the fork-pin retention bore 266).

Figures 17, 18:
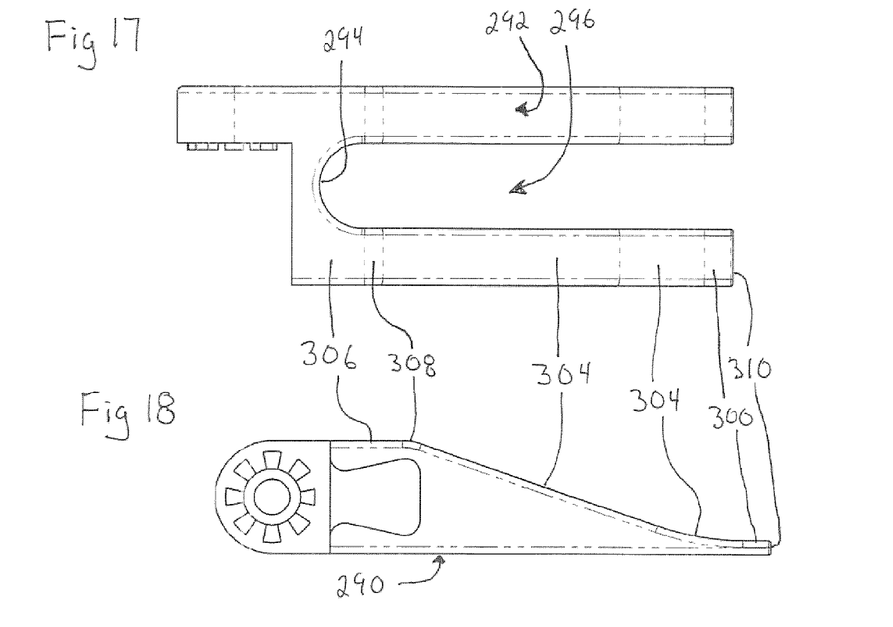
FIG. 17 is a top plan view of the fork shown in FIG. 14.
FIG. 18 is a side elevation view of the fork shown in FIG. 14.

The main fork 260 has a left tine 280 and a right tine 282 in a spaced-apart parallel relationship. The left tine 280 and right tine 282 are connected one to the other at their proximal ends by a base 284. Each tine 280, 282 has an inner side 286, an outer side 288, a tine bottom 290 and a tine top 292. The inner sides 286, outer sides 286 and tine bottoms 290 are planar. The two inner sides 286 and the two outer sides 286 are all parallel to each other. The two tine bottoms 290 are coplanar.

The base 284 defines a slot base 294 (being an inner curve conforming to the inner wall of a bisected right angle cylinder) that with the two inner sides 286 defines a slot 296.

Each tine top 292 includes: a planar lip 300 parallel to the tine bottom 290; a planar wedge face 302 at an angle (about 19 degrees) to the tine bottom 290; a lip-wedge transition curve 304 (being an inner curve conforming to a section of the inner wall of a right angle cylinder); a planar step 306 parallel to the tine bottom 290 and containing the tine top 292 end of the slot base 294; and a wedge-step transition curve 308 (being an outer curve conforming to a section of the outer wall of a right angle cylinder). Between the distal end of the lip 300 and the distal end of the tine bottom 290 there is a tine tip 310.

In a preferred embodiment the following dimensions pertain: slot 296—width 18.9 mm, length (not including slot base) 82.6 mm; slot base 294—radius 9.45 mm; tine 280, 282—width 12.7 mm; tine tip 310—height (i.e., distance between surface of lip 300 and surface of tine bottom 290) 3.2 mm; lip 300—length (i.e., along the length of the tine 280, 282) 6.4 mm; step 306—height (i.e., distance between surface of step 306 and surface of tine bottom 290) 25.4 mm; lip-wedge transition curve 304—radius 57.2 mm; and wedge-step transition curve 308—radius 12.7 mm.

The air-brake adjustment multi-tool 100 embodiment shown in the drawings and described herein is adjustable (by telescoping the handle shaft 120 and handle sleeve 122) between total overall lengths of about 17 inches and about 22½ inches (including the main fork 260 in the extended/linear position). If necessary due to limited work space, the air-brake adjustment multi-tool 100 may be further shortened by removing the handle grip 128.

In use in determining pushrod throw, a tine 280,282 of the main fork 260 may be inserted between the pushrod yoke and the slack adjuster crank arm (or other slack adjuster component) in that the lip 300, lip-wedge transition curve 304 and wedge face 302 are shaped to conform to a curved configuration that is common to the distal end of the slack adjuster crank arm, such that a so-inserted tine 280,282 seats relatively securely and distributes an applied levering force along the slack adjuster crank arm. Further, the dimensions of the tines 280,282 given above are desirably suitable for insertion into the common size of pushrod yoke.

Alternatively, in use in determining pushrod throw, the main fork 260 may be inserted between the yoke nut (or the yoke if there is no yoke nut) and the brake pot, with a tine 280, 282 on either side of the pushrod, and the air-brake adjustment multi-tool 100 may be used to pry the yoke away from the brake pot.

The functionality of the main fork 260 and fork key 262 being releasably fixable in selected angular positions with respect to the handle shaft 120 (as indicated above, 90 degrees, 135 degrees, 180 degrees (i.e, linear), 225 degrees and 270 degrees), facilitates use of the air-brake adjustment multi-tool 100 with a variety of brake assembly configurations. For example, in some instances the air-brake adjustment multi-tool 100 may be used to apply a prying movement by using an adjacent vehicle component (e.g., axle tube) as a fulcrum at a random location along the length of the air-brake adjustment multi-tool 100. Alternatively, with the main fork 260 and fork key 262 releasably fixed in a non-linear angular position with respect to the handle shaft 120, the step 306 and fork end 140 define a fulcrum suitable for prying against a surface proximate the tines 280, 282.

Desirably, the air-brake adjustment multi-tool 100 may be used with the handle grip 128 removed and with the ratcheting socket wrench head 114 fitted to the socket-wrench-head square mount 160 and with a socket (not shown) suitable for rotating the slack adjuster worm. In this way, a single tool may be used (by turning it end to end) to both test and adjust pushrod throw.

The air-brake adjustment multi-tool 100 embodiment shown in the drawings and described herein is suitable for tensioning and releasing conventional load strap ratchets, in that the handle grip 128 may be inserted into the usual pry holes for such ratchets and the handle grip 128 is configured to provide a relatively secure seat in such usual pry holes and the air-brake adjustment multi-tool 100 is sufficiently long for such purpose.

Further, additional implements may be releasably attached to the socket-wrench-head square mount 160. For example, a fifth-wheel puller attachment/adapter/hook (not shown) may be used to release a fifth-wheel trailer connection (with such use, having the main fork 260 and fork key 262 at a 90 or 270 degree angular position with respect to the handle shaft 120, provides a positive grip for pulling). As a further example, various drivers (e.g., screw drives) may be attached directly or indirectly to the socket-wrench-head square mount 160.

The scope of the claims should not be limited by the preferred embodiments set forth in the examples, but should be given the broadest interpretation consistent with the description as a whole.

What is claimed is:

1. A multi-tool for use in testing and adjusting a brake system having a brake chamber, a push rod projecting from the brake chamber and having a distal yoke connected to the crank arm portion of a slack adjuster, the multi-tool comprising:
 a handle assembly having a first handle end and a second handle end;
 a fork assembly comprising two spaced apart tines, being a left tine and a right tine, each tine comprising a tine top comprising:
   a distal insertion lip surface;
   an angled wedge face; and
   a lip-wedge transition curve surface between the insertion lip surface and wedge face; and
 wherein the fork assembly is releasably fixable to the first handle end in a plurality of selected angular orientations;
 whereby for testing the brake system by moving the push rod, a user may fix the fork assembly and first handle in a desired angular position and may insert:
   one of the tines into the yoke adjacent the slack adjuster crank arm; or
   the tines between the yoke and brake chamber, with the tines on opposite sides of the push rod.

2. The multi-tool of claim 1, wherein:
 each tine comprises a planar tine bottom surface; and
 in each tine:
   the insertion lip surface is planar and substantially parallel to the tine bottom surface; and
   the wedge face is planar and is at an angle to the tine bottom of about 15 degrees to about 25 degrees.

3. The multi-tool of claim 2, wherein in each tine:
 a tip thickness, being a distance between the insertion lip surface and the tine bottom surface, is about 2 mm to about 5 mm; and
 an insertion lip length, being the extent of the insertion lip surface along a length of the tine, is about 4 mm to about 9 mm.

4. The multi-tool of claim 3, wherein, in each tine:
 the wedge face is at an angle to the tine bottom of about 19 degrees;
 the tip thickness is about 3.2 mm;
 the insertion lip length is about 6.4 mm; and
 the lip-wedge transition curve surface is an inner curve substantially conforming to a section of an inner wall of a right angle cylinder having a lip-wedge transition curve radius of about 40 mm to about 80 mm.

5. The multi-tool of claim 4, wherein the the lip-wedge transition curve radius is about 57 mm.

6. The multi-tool of claim 1, wherein the left tine and the right tine are substantially parallel one to the other, and define a slot therebetween having a slot width of about 15 mm to about 25 mm.

7. The multi-tool of claim 1, wherein the slot width is about 19 mm.

8. The multi-tool of claim 1, wherein the selected angular orientations comprise five discrete angular orientations, including a linear orientation.

9. The multi-tool of claim 1, further comprising a handle grip releasably securable to the second handle end.

10. The multi-tool of claim 9 for use with a load strap ratchet having a pry hole, wherein the handle grip is sized for engagement with the pry hole.

11. The multi-tool of claim 1, further comprising a tool mount at the second handle end for releasably attaching an implement to the second handle end.

12. The multi-tool of claim 11, wherein the implement is a socket wrench head.

13. The multi-tool of claim 1, wherein the handle assembly comprises:
 a handle sleeve having a handle sleeve interior; and
 a handle shaft in slidable telescoping engagement with the handle sleeve interior, whereby the handle assembly may be reversibly lengthened by sliding the handle shaft within the handle sleeve.

14. The multi-tool of claim 13, further comprising telescope lock means for releasably fixing the handle shaft relative to the handle sleeve in a plurality of discrete telescope positions.

15. The multi-tool of claim 13, further comprising:
 a handle grip for attaching to the second handle end; and
 a handle-grip lock-release for releasably securing the handle grip when the handle grip is attached to the second handle end;
 wherein, moving the handle shaft to a fully compressed telescoping position relative to the handle sleeve actuates the handle-grip lock-release to change from a default handle-grip lock position to a handle-grip release position permitting detachment of the handle grip from the second handle end.

16. The multi-tool of claim 13, further comprising:
one or more implements;
a tool mount at the second handle end for releasably attaching one of the one or more implements to the second handle end; and
a tool-mount lock-release for releasably securing the implement when the implement is attached to the tool mount;
wherein, moving the handle shaft to a fully compressed telescoping position relative to the handle sleeve actuates the tool-mount lock-release to change from a default tool-mount lock position to a tool-mount release position permitting detachment of the implement from the tool mount.

17. The multi-tool of claim 13, further comprising:
a handle grip for attaching to the second handle end;
a handle-grip lock-release for releasably securing the handle grip when the handle grip is attached to the second handle end;
one or more implements;
a tool mount at the second handle end for releasably attaching one of the one or more implements to the second handle end; and
a tool-mount lock-release for releasably securing the implement when the one of the one or more implements is attached to the tool mount;
wherein, use of one or the other of the handle grip and the tool mount precludes use of the other, in that:
when the handle grip is attached to the second handle end, the one of the one or more implements may not be attached to the second handle end; and
when the one of the one or more implements is attached to the tool mount, the handle grip may not be attached to the second handle end;
wherein, moving the handle shaft to a fully compressed telescoping position relative to the handle sleeve:
actuates the handle-grip lock-release to change from a default handle-grip lock position to a handle-grip release position permitting detachment of the handle grip from the second handle end; and
actuates the tool-mount lock-release to change from a default tool-mount lock position to a tool-mount release position permitting detachment of the implement from the tool mount.

18. The multi-tool of claim 1, further comprising a light releasably attachable to the handle assembly.

\* \* \* \* \*